United States Patent
Albuaijan

(12) 
(10) Patent No.: US 6,435,022 B1
(45) Date of Patent: Aug. 20, 2002

(54) PARTIAL STROKE TESTING SYSTEM

(76) Inventor: Tareq Nasser Albuaijan, Post Box # 17289, Khaldiya 71453 (KW)

(*) Notice: Subject to any disclaimer, the term of this patent is extended or adjusted under 35 U.S.C. 154(b) by 0 days.

(21) Appl. No.: 09/779,661

(22) Filed: Feb. 9, 2001

(51) Int. Cl.[7] .............................................. F16K 37/00

(52) U.S. Cl. ........................................................ 73/168

(58) Field of Search ........................................... 73/168

(56) References Cited

U.S. PATENT DOCUMENTS 6,131,609 A * 10/2000 Metso et al. .................. 73/168

* cited by examiner

Primary Examiner—Robert Raevis
(74) Attorney, Agent, or Firm—Dennison, Schultz & Dougherty

(57) ABSTRACT

A partial stroke testing system for online testing of emergency shut-off valve, said system is designed for implementation on an emergency shut-off valve with a main solenoid with manual reset, main solenoid valve, quick exhaust valve and a pneumatic actuator connected to a source of pressurized air supply for opening and closing the said emergency shut-off valve and the said shut-off valve normally movable between a fully open and fully closed position. The system also include control means programmed into the plant emergency shutdown system controller for initiating electrical signal for initiating a test and for enhancing the bleed rate from the said pneumatic actuator in the event of a emergency trip signal. Test means for testing the said emergency shut-off valve without fully closing the emergency shut-off valve in response to signal from the said control means is included in the system. The said test means, controlled by the said control means, include a second solenoid and a second solenoid valve for bleeding off pressurized air to thereby move the said emergency shut-off valve from full opened position to partially closed position. Means for limiting the movement of said emergency shut-off valve to a partially closed position because of the bleeding of pressurized air is included in the system. The system also includes an isolation valve for isolating the said test means for maintenance purpose.

11 Claims, 3 Drawing Sheets

PARTIAL STROKE TESTING SYSTEM

FIELD OF THE INVENTION

This invention relates to a partial stroke testing system and more particularly to a partial stroke testing system for the online testing of an emergency shut-off valve.

BACKGROUND FOR THE INVENTION

In the oil, gas, petroleum and power industries, various conditions may occur that necessitate immediate shut down or tripping of the operations, process or plant. In those industries, a majority of the final control element of shut-down systems are implemented with fast acting shut-off valves. In such industries, a majority of the shut-off valves remains open while the process is in a safe and controlled state. Such valves are closed only upon a plant trip rising from an out of control process or during a normal maintenance outage.

In practice, the testing of emergency shut-off valve is normally done during shut down of the process. However, there is tendency for such valves to stick or freeze due to corrosion or other reasons, which lead to an unsafe condition. This problem is exacerbated by economic conditions which have lead to a reduction in the frequency of shut-downs. For example, in some operations, a process may run continuously for one or more years without shutting down the process for maintenance.

State of the art emergency shutdown systems, which control the shut-off valves, have a number of features to detect plant or process failures and typically include redundancies for added reliability. However, such systems may not provide for the testing of shut-off valves itself other than stroking the valve. The problem is that full stroking or completely closing the valve causes an undesirable disruption in the process.

Recognizing that the emergency shut-off valve can be stroked partially as a safeguard against frozen or stuck valve has lead to a need for a simple, secure and reliable system for testing such valves without adversely effecting production. This approach will also improve the safety of the operation.

It is now believed that a partial stroke testing system in accordance with the present invention will provide a low cost, simple and reliable test for emergency shutdown valves in the oil, gas, petrochemical and power industries. Such tests will not adversely interrupt a process and will minimize or almost eliminate the risk of a "frozen" emergency shutoff valve in the event of an out of control process. The system in accordance with the present invention is cost effective and has been designed to utilize a shut-off valve with fast acting piston actuator. The system is also applicable to slow acting valves.

In addition, the partial stroke testing system in accordance with the present invention will not interfere with a plant trip, i.e. a full shut down due to an emergency condition. Furthermore, if a partial stroke test is being conducted at the time of a plant trip, the partial stroke test will contribute to a more rapid closing of the emergency shut-off valve. Thus, the partial stroking design acts as a backup to the main trip mechanism. Accordingly, such systems should reduce the cost of insurance or risk coverage. In essence, the system partially closes the emergency shut-off valve to a predetermined position to test and confirm its ability to function and to ensure its availability on demand in the event of a plant emergency.

BRIEF SUMMARY OF THE INVENTION

In essence, the present invention contemplates a partial stroke testing system or apparatus for the online testing of emergency shut-off valves. Such systems are particularly applicable in the oil, gas and petrochemical industries. The system is designed for implementation on an emergency shut-off valve, which is normally movable between a fully opened and a fully closed position. As contemplated by the preferred embodiment of the invention, the emergency shut-off valves will be in its fully opened position during operation of a process and will rapidly close to shut down the process in the event of an emergency. The system is designed for interfacing to the plant emergency shutdown system controller for generating electrical signals for initiating the test and to a source of pressurized gas such as compressed air for driving the system. The essential control components of an emergency shut-off valve are the main trip solenoid valve with manual reset, quick exhaust valve and the pneumatic actuator. On a trip signal, the solenoid valve de-energizes signaling the quick exhaust valve to vent the actuator and close the shut-off valve. The invention provides a test means for testing the emergency shut-off valve without fully closing the emergency shut-off valve in response to a signal from the plant emergency shutdown system controller. The test means includes a second solenoid valve for bleeding off compressed air to thereby move the emergency shut-off valve from a fully opened position to a partially closed position. Means such as closed limit switch which may be operable on the basis of the movement of the shut-off valve is provided. Means such as a timer set to a predetermined time limit to terminate the shut-off valve test in the event of the limit switch failure is also provided. In addition, means for initiating cyclical or periodical testing and reporting of test results of the partial stroking of the emergency shut-off valve is provided.

The invention will now be described in connection with the accompanying drawings.

DESCRIPTION OF THE PREFERRED EMBODIMENT OF THE INVENTION

It is well known in the oil, gas and petrochemical industries that emergency shut-off valves are susceptible to a build-up of frictional forces which if undetected can cause failure of the emergency shut-off valve during an out of control process. It is for this reason, that the various regulatory agencies concerned with the safety of such operations, mandate periodic shut-off valve testing and inspection in order to ascertain shut-off valve availability.

As disclosed herein, a partial stroke test system tests an emergency shut-off valve on-line, i.e. without shutting down the process, for free movement over a small portion of its full stroke. Therefore, tests can be performed at frequent intervals. By so doing, there is a high probability of ensuring the emergency shut-off valve's operability, which reduce the likelihood of failure of an emergency shut-off valve during extended runs.

In the oil, gas and petrochemical industries, emergency shut-off valves generally remain open while the process is in a safe and controlled state. These valves close only upon a plant trip, which arises from an out of control process. The emergency shut-off valve typically includes a pneumatic cylinder which drives an emergency shut-off valve into a fully closed position within about one second.

Figure 1:
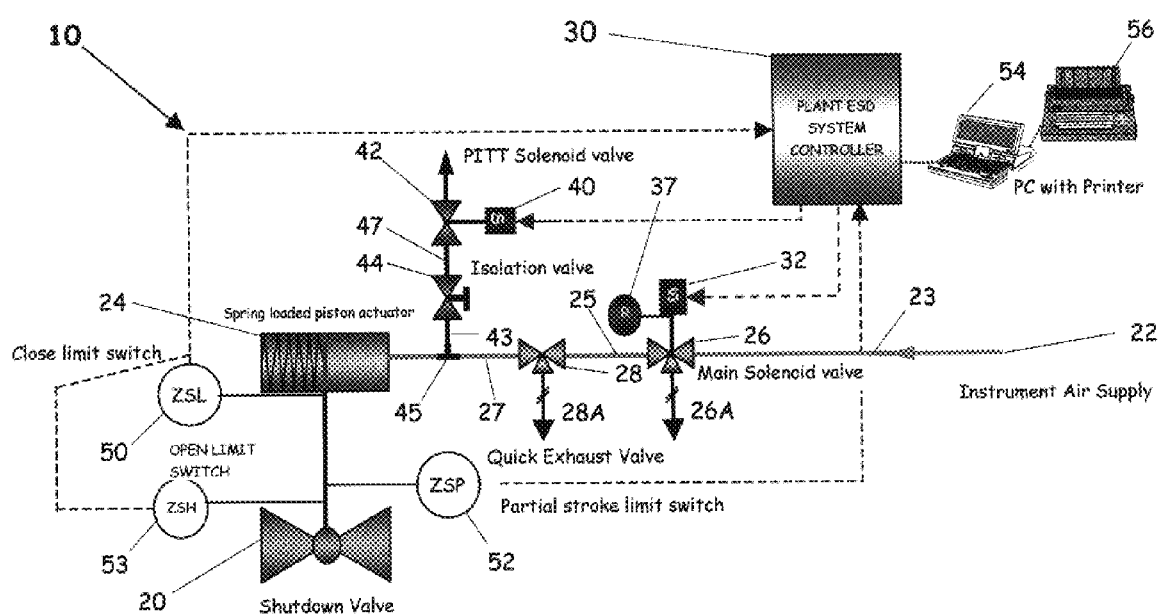
FIG. 1 is schematic illustration of a partial stroke testing system in accordance with a preferred embodiment of the invention.

A partial stroke testing system 10, incorporated in a shut-off valve for use in the oil, gas, petrochemical and power industries is illustrated schematically in FIG. 1. Such system is incorporated in an emergency shut-off valve 20 which remains in an open position during normal process conditions. Compressed air from a source 22 is used for maintaining the valve 20 in an open position. The compressed air maintains the valve 20 in an open position by driving a spring biased piston actuator 24. The compressed air is connected with the spring biased actuator 24 through a main solenoid valve 26 and a quick exhaust valve 28. The source 22 of compressed air is connected to the main solenoid valve 26, quick exhaust valve 28 and actuator 24 by tubing 23, 25 and 27.

In the event of plant trip i.e. an out of control process, a signal as for example from plant emergency shutdown system controller 30 actuates a solenoid 32 which closes the main solenoid valve 26 with respect to the pressurized air from the source 22 and allow the air from tubing 25 to exhaust through an exhaust port 26A. The release of pressure against the quick exhaust valve 28 opens an exhaust port 28A allowing the actuator 24 to bleed through tubing 27, quick exhaust valve 28 and exhaust port 28A and close the shut-off valve 20 and thereby shut down the process or plant.

The partial stroke testing portion of the system 10 includes a second solenoid 40 and second solenoid valve 42. That portion also includes an isolation valve 44. The second solenoid valve 42 is operatively connected to the actuator 24 through tubing 47, isolation valve 44, tubing 43 and "T" connection 45 through tubing 27.

For a partial stroke test, a signal from the plant emergency shutdown system controller 30 energizes the second solenoid 40 which opens the second solenoid valve 42 to bleed off compressed air so that the spring biased actuator 24 partially closes the shut down valve 20. This partial closing is limited by partial stroke limit switch 52, which sends a signal to plant emergency shutdown system controller 30 in a conventional manner. The plant emergency shutdown system controller 30 de-energizes the solenoid 40 to thereby close the second solenoid valve 42 and the shut-off valve returns to fully open state. By limiting the movement of the shut down valve 20 by time or stroke, there is no interruption of the process. Nevertheless open limit switch 53 and partial stroke limit switch 52 provide signals to the plant emergency shutdown system controller 30 that the valve actually moved which indicate it is not frozen or stuck. Suitable sensing means such as a linear variable transducer can also be used to check that the valve 20 has in fact been displaced in response to the signal from the plant emergency shutdown system controller 30. If the linear variable transducer indicate that a preselected degree of deflection has occurred, the valve tested has been shown to be free to move.

However, if the sensing means indicate that the deflection has not occurred, signal is sent to the plant emergency shutdown system controller 30 indicative of the fact Suitable alarm is to be provided to indicate that the valve is stuck and to initiate corrective action.

The magnitude of the displacement may be any suitable degree to positively indicate that the valve movement is possible, but must not be of such magnitude as to disrupt the process or the plant operation and will ordinarily be accomplished in few seconds or less.

The plant emergency shutdown system controller 30 may be interfaced to a computer 54 to initiate periodic partial stroking of the shut-off valve 20. The computer 54 is also used to record the results of each test, which may be printed out on a printer 56. The isolation valve 44 isolates the second solenoid valve 42 from the shut-off valve system for maintenance without affecting the operation of the shut-off valve.

The manual latch facility 37 in the main solenoid valve allows the operators to manually open the shut-off valve, after field verification, subsequent a trip and reset of the trip signal.

Figure 2:
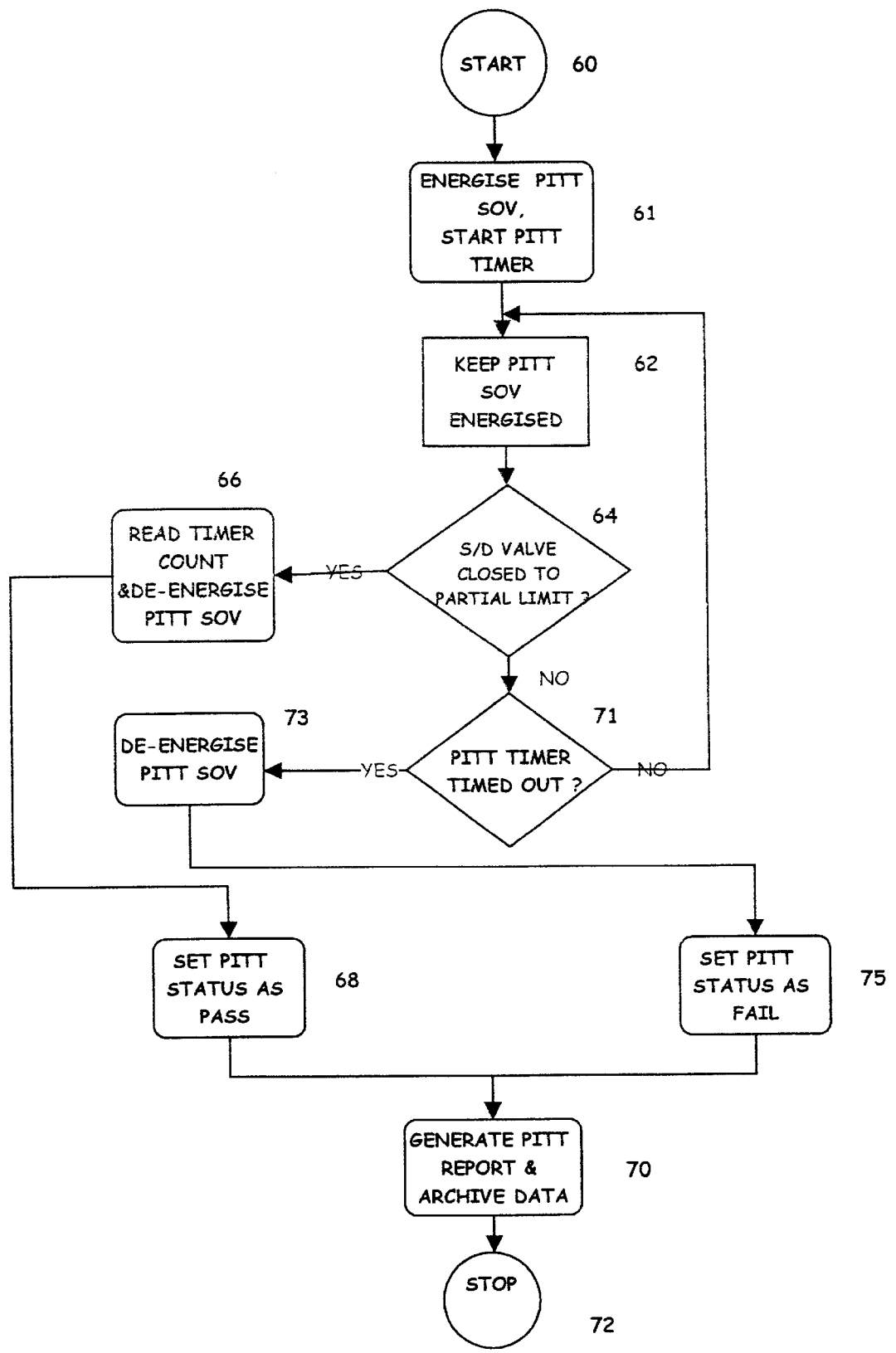
FIG. 2 is a flow chart, which illustrates the operation of a partial stroke testing system software, residing in the plant emergency shutdown system controller, in accordance with the present invention

The control sequence, for conducting the partial stroke test of shut-off valve, programmed into the plant emergency shutdown system controller 30 (FIG. 1) is illustrated in FIG. 2. The Partial Instrument Trip Testing (PITT) or partial stroking of the shut-off valve is initiated by the plant emergency shutdown system controller 30 (FIG. 1) by initiating the execution of the program sequence illustrated in FIG. 2. Starting at step 60 the plant emergency shutdown system controller 30 (FIG. 1) energizes power supply to the solenoid 40 (FIG. 1) of the solenoid valve 42 (FIG. 1) and start an internal timer as indicated in step 61. On energisation of the solenoid 40(in FIG. 1), the solenoid valve 42 (FIG. 1) opens and bleed the actuator air supply causing the actuator 24 (in FIG. 1) to move the shut-off valve 20 (FIG. 1) towards the closed position.

The shut-off valve movement to partial limit is checked in step 64. If the shut-off valve 20 (FIG. 1) has reached the partial limit, the program sequence proceeds to step 66 to de-energizes the solenoid 40(in FIG. 1) to close the solenoid valve 42 (FIG. 1) and to stop the timer. The actuator 24 (FIG. 1) on closure of the solenoid valve 42 (in FIG. 1) gets full air supply and drive the shut-off valve 20 (in FIG. 1) to fully open position.. The program sequence then proceeds to step 68 to set the status of the test as pass and to step 70 for generating test report and archiving of test data. After generating the test report and archiving the test data, (valve Tag. No, test status and test duration), the test control sequence is terminated at step 72 and divert to other applications in the plant emergency shutdown system controller 30 (FIG. 1)

In the event that the shut-off valve has not closed to its partial limit in step 64 and the test timer (PMT timer) has not timed out as in step 71, the control sequence returns to step 62 and loop through steps 64 and 71 until either the valve reaches the partial limit or the PITT timer time out.

In the event that the shut-off valve has not closed to its partial limit in step 64 and the test timer (PITT timer) has timed out as in step 71, the control sequence goes to step 73 to de-energizes the solenoid 40 (FIG. 1) to close the solenoid valve 42 (FIG. 1). The actuator 24 (FIG. 1) on closure of the solenoid valve 42 (FIG. 1) gets full air supply and drive the shut-off valve 20 (FIG. 1) to fully open position. The program sequence then proceeds to step 75 to set the status of the test. as fail and to step 70 for generating test report and archiving of test data. After generating the test reports and archiving the test data, (valve Tag. No, test status and test duration), the test control sequence is terminated at step 72 and divert to other applications in the plant emergency shutdown system controller 30 (FIG. 1).

Figure 3:
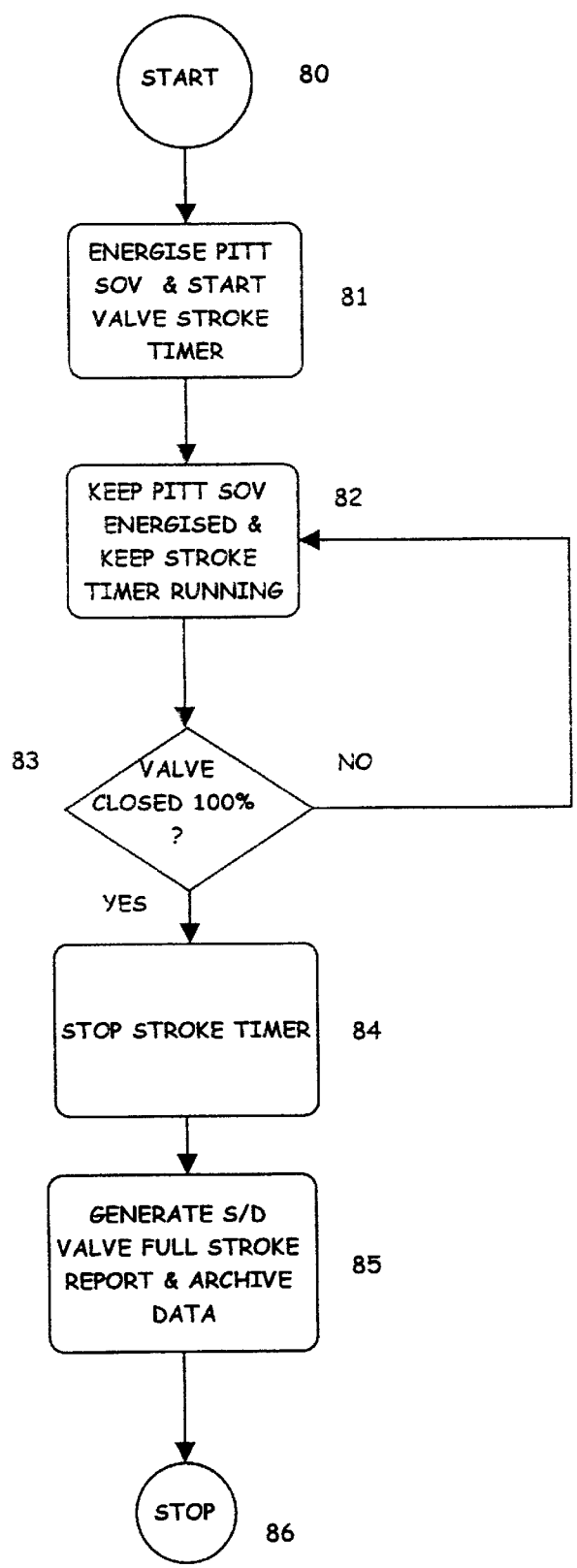
FIG. 3 is a flow chart, which illustrates the operation of the software, residing in the plant emergency shutdown system controller, controlling the partial stroking means in the event of an emergency trip signal from the plant emergency shutdown system controller in accordance with the present invention.

A bleed enhancement scheme in accordance with the embodiment of the invention is illustrated in FIG. 3. The bleed enhancement is achieved by implementing the control scheme as indicated in FIG. 3 in the plant emergency shutdown system controller 30 (FIG. 1)as an application program routine. The program is initiated in the event of an emergency trip signal at step 80. On an emergency trip, plant emergency shutdown system controller 30 (FIG. 1) issues a trip signal to de-energizes the main solenoid valve 26 (FIG. 1), energizes the PITT solenoid valve 42 (FIG. 1) and starts a valve stroke timer as in step 81. The PITT solenoid valve 42 (FIG. 1) will remain energised and the valve stroke timer continue to run as indicated in step 82 until the shut-off valve is fully closed as in step 83. Up on full closure of the shut of valve the timer is stopped as in step 84. The plant emergency shutdown system controller 30 (FIG. 1) will then generate a full stroke report and archive the valve stroke time data as in step 85. Upon completion of the report generation and data archiving task the control sequence is terminated at step 86 and divert to other applications in the plant emergency shutdown system controller 30 (FIG. 1).

The PITT solenoid valve 42 (FIG. 1) will remain energised until the trip is reset. The additional bleed introduced by the solenoid valve 42 (FIG. 1) will enhance the shutdown performance of the shut-off valve.

A partial stroke testing system for on line testing of emergency shut off valves can also implemented as a portable self contained test apparatus for conducting partial stroke test on shut off valves which are controlled by non-programmable shutdown system.

While the invention has been described in connection with its preferred embodiments, it should be recognized that changes and modifications may be made therein without departing from the scope of the applied claim.

What is claimed is:

1. A partial stroke testing system for online testing of an emergency shut-off valve, said system implemented on an emergency shut-off valve normally movable between fully opened and fully closed position, said system comprising an emergency shut-off valve, control means for initiating an electrical signal for initiating a test on said emergency shut-off valve, a source of pressurized gas and means including a main solenoid responsive to a signal from said control means, a main solenoid valve and a quick exhaust valve connected to said source of pressurized gas and a pneumatic actuator for opening and closing the said shut-off valve, test means for testing said emergency shut-off valve without fully closing said emergency shut-off valve in response to a signal from said control means, said test means including a second solenoid, a second solenoid valve for bleeding off pressurized gas to thereby move said emergency shut-off valve from full opened position to a partially closed position, means for limiting the movement of said emergency shut-off valve to a partially closed position as a result of the bleeding off of pressurized gas and means for detecting actual movement of said emergency shut-off valve.

2. A partial stroke testing system for online testing of an emergency shut-off valve according to claim 1 which includes means for initiating partial stroke test manually or at programmed intervals from a computer interfaced to said control means and to generate printed report of test results.

3. A partial stroke testing system for testing of an emergency shut-off valve according to claim 1, which can be implemented as a portable and self contained test apparatus for conducting partial stroke test on shut-off valves controlled by a non-programmable shutdown system.

4. A partial stroke testing system for online testing of an emergency shut-off valve according to claim 1, which includes means preventing inadvertent manual opening of the said emergency shut-off valve, subsequent emergency closure of the said emergency shut-off valve as a result of a trip signal from the control means and prior to reset of trip signal in the plant emergency shutdown system controller.

5. A partial stroke testing system for online testing of an emergency shut-off valve according to claim 1 which includes means of monitoring the full stroke travel time of said emergency shut-off valve in the event of emergency closure of said emergency shut-off valve as a result of a trip signal from said control means.

6. A partial stroke testing system for online testing of an emergency shut-off valve according to claim 1, which bleeds pressurized gas from pneumatic actuator during partial stroke checking of emergency shut-off valve.

7. A partial stroke testing system for online testing of an emergency shut-off valve according to claim 1 which bleeds pressurized air from the system during emergency closure (trip) of the said emergency shut-off valve to enhance the bleed rate and act as a backup to the main solenoid valve and quick exhaust valve in the event of unsafe failure to the said main solenoid valve and quick exhaust valve.

8. A partial stroke testing system for online testing of an emergency shut-off valve according to claim 1 which includes an isolation valve between said second solenoid valve said pneumatic actuator for isolating the said second solenoid valve from the rest of the system.

9. A partial stroke testing system for online testing of an emergency shut-off valve according to claim 1, which includes a control sequence programmed into said control means for initiating a partial stroke test on said shut-off valve.

10. A partial stroke testing system for online testing of an emergency shut-off valve according to claim 9, in which backup means for terminating the partial stroke test is a timer programmed into the partial stroke testing system controller.

11. A partial stroke testing system for online testing of an emergency shut-off valve according to claim 1, in which the means for detecting the movement of the said emergency shut-off valve is a limit switch.

* * * * *